UNITED STATES PATENT OFFICE.

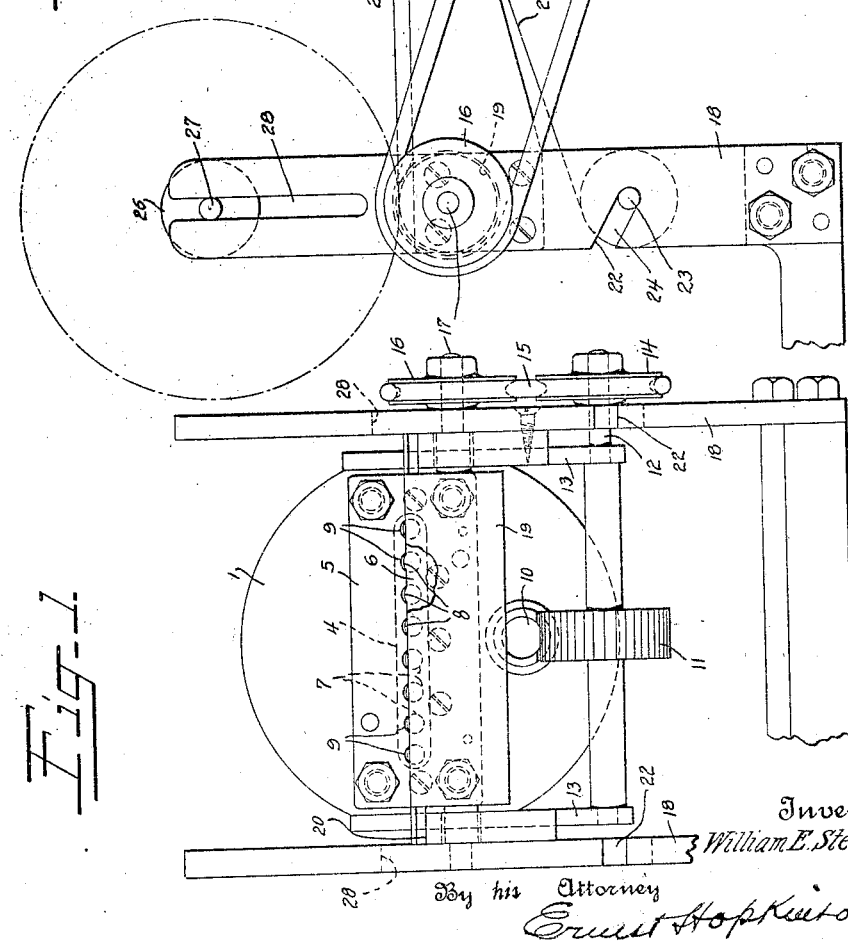

WILLIAM E. STEWART, OF PROVIDENCE, RHODE ISLAND, ASSIGNOR TO REVERE RUBBER COMPANY, A CORPORATION OF RHODE ISLAND.

AUTOMATIC TAKE-UP ATTACHMENT.

1,381,249.            Specification of Letters Patent.     Patented June 14, 1921.

Application filed September 22, 1920. Serial No. 411,905.

*To all whom it may concern:*

Be it known that I, WILLIAM E. STEWART, a citizen of the United States, residing at Providence, in the county of Providence and State of Rhode Island, have invented a certain new and useful Automatic Take-Up Attachment, of which the following is a full, clear, and exact description.

This invention relates to an automatic take-up attachment, more particularly to an attachment for automatically taking up plastic material as extruded from a tubing machine.

In the art of plastics the use of tubing machines in which material is pressed through dies of such shape as to produce an article of the desired form, is common. In particular, in the manufacture of vulcanizable articles, the use of tubing machines is general for the making of tubing, tire beads, half round beads, and many other forms of strip. Prior to my invention the material when extruded from the die in bead or other strip form has ordinarily been received on an endless conveyer, and is then cut up in lengths determined by the capacity of the conveyer and removed. This method of disposing of the material is open to a number of objections. In the first place, the services of an operator are constantly required during the use of the machine to cutup and remove the strips, beads or other articles being formed. Moreover, due to the nature of the material it is rather difficult to handle without distortion and stretching, and as it is cut into relatively short lengths there is considerable waste due to short ends left over when these lengths are afterward cut up for use. These objections are multiplied when using a die which forms a plurality of beads or strips at a single operation.

An object of my invention is to provide an automatic take-up means for die formed plastic material as it is extruded from the die.

Another object is to provide an automatic take-up means for the extruded die formed material governed by the pressure within the die mechanism.

Still another object is to provide an automatic take-up means actuated by material extruded from the die.

A further object is to provide an automatic means for winding up the extruded material under a uniform tension irrespective of its speed of ejection from the machine.

A further object is to provide a conveyer for transporting extruded plastic material from a die mechanism to a wind-up reel, which conveyer also acts as a liner for the wound up material.

A still further object is to provide automatic means for taking up in continuous lengths the die formed plastic material extruded from a tubing machine.

For a full and complete disclosure of the invention reference is had to the accompanying specification and drawings, in which latter:

Figure 1 is a front elevation of the take-up attachment with parts removed and broken away.

Fig. 2 is a side elevation of the attachment, partly in section.

Referring to the drawings, the numeral 1 represents a die head which is attached to an ordinary form of tubing machine by the threads 2. The die head is provided with a bore 3 terminating in an elongated aperture 4, over which are secured by bolts the superposed die plates 5 and 6. The die plate 5 is provided with a series of circular apertures 7 communicating with the aperture 4, and the die plate 6 is disposed on the plate 5 in such manner that the series of curved projections 8 at one edge of the plate 6 register with the apertures 7 to form the crescent-shaped die openings 9, see Fig. 1. Also communicating with the bore 3 is a nozzle 10, and a toothed drive wheel 11 mounted on shaft 12 is disposed with its periphery within the bore of the nozzle 10 as shown in Figs. 1 and 2. The shaft 12 is mounted in bearings in brackets 13 carried by the die head and a pulley 14 is mounted on one end of said shaft. This pulley, by means of belt 15, is connected to the pulley 16 mounted on a shaft 17 having bearings in the frame 18, and also mounted on said shaft is a friction roller 19, the purpose of which will be later explained.

Extending from the frame 18 toward the die head is a shelf or table 20 carrying at its end adjacent the die head an idler roll 21. Removably mouned in the bearing slots 22 in frame 18 is the shaft 23 of a roll 24 of liner or wrapper material, and the liner 25 as unwrapped therefrom is led over the idler roll 21, thence across the shelf 20 and between the friction roller 19 and a wind up reel 26, the shaft 27 of which is freely movable in the bearing slots 28 in frame 18, the liner being wound on the reel 26 by the friction roller 19.

In operation with the liner 25 adjusted to wind up on the reel 26 as just described, the tubing machine is started and the beads of vulcanizable material extruded from the openings 9 are delivered on the liner 25. The material issuing from the nozzle 10 at the same time actuates the toothed drive wheel 11 which latter through the pulley 14, belt 15 and pulley 16 drives the friction roller 19, causing the liner 25 to be drawn from the roll 24 and wound on the reel 26. Hence the beads issuing from the die openings 9, as they are received on the liner 25, are wound up in superposed relation with the liner on the reel 26. It will be noted that the shaft 27 of the reel 26 is freely movable in the slots 28 and that the wind-up reel 26 is driven at a uniform peripheral speed, irrespective of its seize by its frictional contact with the roller 19.

Moreover, the material issues from the die openings 9, and nozzle 10 at a speed proportionate to the pressure on the material within the tubing machine, and any increase in the pressure resulting in an increase in the speed with which the material is ejected from the openings 9 will cause a proportionate increase in the speed with which the material is ejected from the nozzle 10. Hence, having in mind the relative areas of the combined openings 9 and nozzle 10, if the sizes of the pulleys 14 and 16 are proportioned to secure for any particular pressure a speed of the liner 25 equal to the speed at which the beads are extruded from openings 9, the liner 25 will continue to be driven at a speed equal to that of the beads whether the pressure in the die mechanism be increased or decreased. It is obvious that if the shape or number of the openings 9 be changed so that their total area is also changed with respect to that of the nozzle 10, a change in the pulleys will also be necessary. The material extruded from the nozzle 10 is used solely to actuate the drive wheel 11, and after having served its purpose is returned to the tubing machine for use over again. The particular form of die head shown forms no part of my invention, and it is evident that any shape or number of die openings 9 may be used. While a particular form of overflow drive mechanism for the conveyer has been shown, it is apparent that the invention is not limited thereto, and any other suitable form of conveyer may also be used.

By the use of my invention the machine is provided with a take-up attachment which is automatic in character, thus doing away with the services of an operator during the use of the machine; the beads or other form of strip extruded from the die are wound up in continuous lengths, thereby avoiding the waste occasioned by the former method of taking off the material; and all distortion and stretching of the bead while in its semi-plastic condition is avoided.

It is evident that the invention is not limited to the specific application thereof disclosed, and numerous changes may be made within the scope of the appended claims.

Having thus described my invention, what I claim and desire to protect by Letters Patent is:

1. In combination, means for die forming a plastic material, and automatic means actuated by part of the extruded material for removing the remainder of said material as formed at a speed proportionate to its speed of issuance from the die opening.

2. In combination, pressure means for die forming plastic material, and an automatic take-up for the extruded material governed by the pressure within said first means.

3. In combination, means for die forming a plastic material, and automatic wind-up means for the material actuated by material extruded from said first means.

4. In combination, pressure means for die forming plastic material, and automatic wind-up means for the material frictionally driven by material extruded from said first means.

5. In combination, die pressing means having a plurality of outlets through which plastic material may be ejected under pressure, and means actuated by the material issuing from one of said outlets for removing material issuing from the remainder as fast as ejected.

6. In combination, pressure means for ejecting die formed plastic material in a continuous length, and automatic means governed by the pressure in said first means, for winding up the formed material on a reel.

7. In combination, pressure means for ejecting die formed plastic material in a continuous length, and automatic means governed by the pressure in said first means for frictionally winding up the material and an interposed liner on a reel.

8. In combination, die pressing means for plastic material, a conveyer for removing the formed material disposed adjacent the outlet of said means, and drive means for said conveyer automatically governed by the pressure on said material in said first means.

9. In combination, die pressing means having a plurality of outlets through which plastic material may be ejected under pressure, and a conveyer disposed to receive material extruded from one of said outlets and driven by the flow from another outlet.

10. In combination, die pressing means having an outlet for extruding plastic material, a conveyer disposed to receive the extruded material, an overflow outlet for said die pressing means, and means actuated by the overflow for driving said conveyer.

11. In combination, pressure means for die forming plastic material into a continuous strip, a conveyer strip upon which said first strip is delivered, and means frictionally acting upon said second strip for winding the superimposed strips on a reel.

12. In combination, pressure means for extruding die formed plastic material, a wind-up reel for the material, means for conveying the extruded material to the reel and winding it thereon in spaced layers, and means governed by the pressure in the die forming means for actuating said conveying means.

13. In combination, a yieldingly mounted wind-up reel, a roll coacting therewith for frictionally winding a liner strip thereon, pressure means for extruding die formed plastic material on said liner strip, and means actuated by material extruded from said pressure means for driving said roll.

14. In combination, pressure means for extruding die formed plastic material, a liner strip for conveying the extruded material from said means, coacting means for actuating the liner strip and winding it in superposed relation with the extruded material, and means actuated by material extruded from said pressure means for driving said coacting means.

15. In combination, pressure means for die forming plastic material into a continuous strip, a conveyer strip upon which said first strip is delivered, means frictionally acting upon said second strip for winding the superposed strips on a reel, and automatic means governed by the pressure in said first means for driving said frictionally acting means.

16. In combination, pressure means for ejecting die formed plastic material in a continuous length, a wind up reel for the formed material, means for winding the material on said reel at a uniform peripheral speed irrespective of the size of the roll on the reel, and means governed by the pressure in said first means for varying the speed of the wind up means in accordance with that of the ejected material.

17. In combination, pressure means for discharging die formed plastic material in a continuous strip, a continuous liner strip disposed to receive the formed plastic material, a vertically movable wind up reel adapted to receive said strips, a wind up roller adapted to contact with said liner strip adjacent its winding point on the reel, an overflow discharge opening from said pressure means, and means actuated by the discharge therefrom for driving said wind up roller.

Signed at Providence, Rhode Island, this fifteenth day of Sept., 1920.

WILLIAM E. STEWART.